June 23, 1942.  A. CHRISTIANSON  2,287,757
VEHICLE DIAPHRAGM
Filed Oct. 19, 1940  6 Sheets-Sheet 1

Inventor
Andrew Christianson
By Mann, Brown & Co.
Attys

June 23, 1942.  A. CHRISTIANSON  2,287,757
VEHICLE DIAPHRAGM
Filed Oct. 19, 1940   6 Sheets-Sheet 2
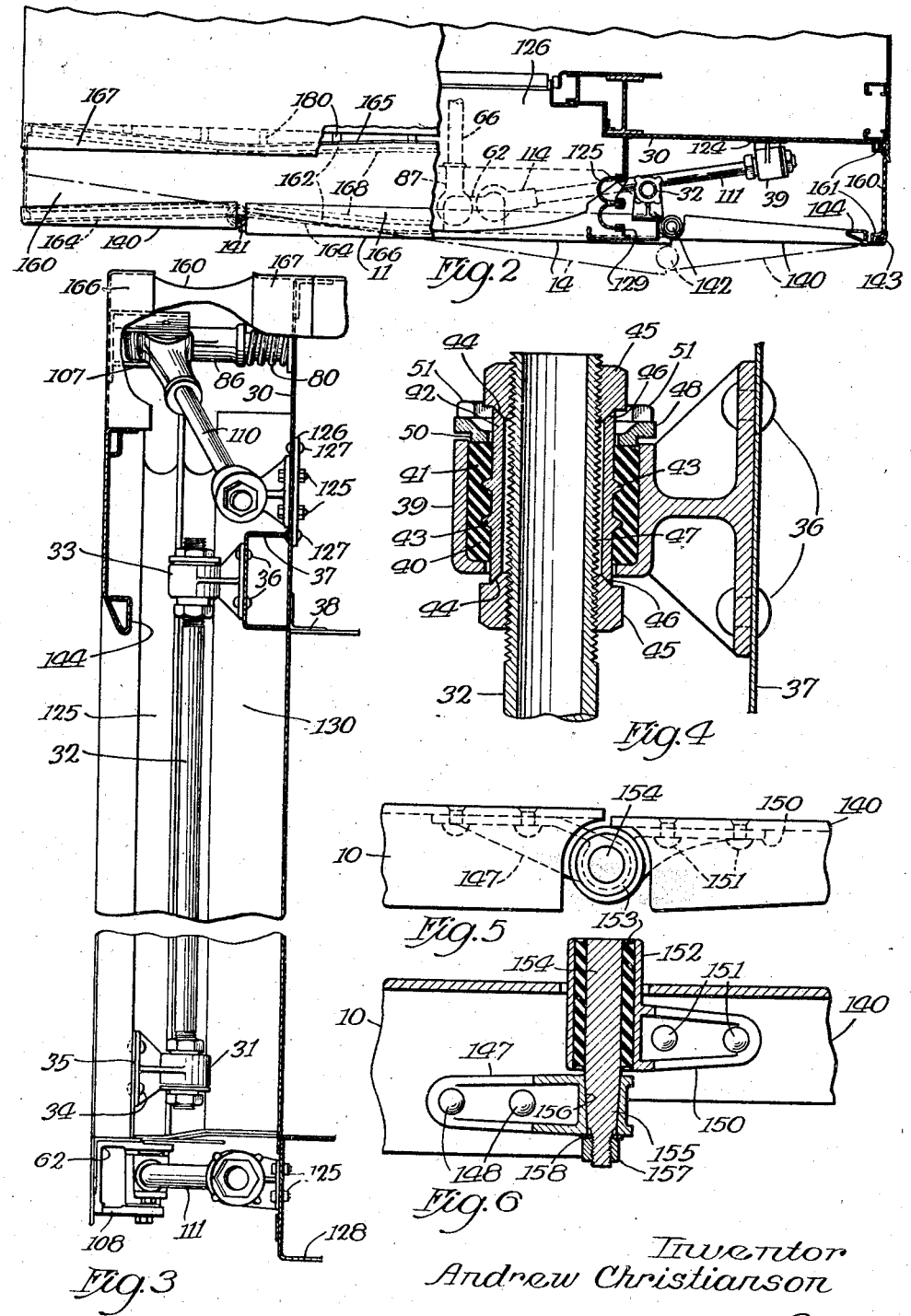
Inventor
Andrew Christianson
By Mann, Brown & Co
Attys.

June 23, 1942.    A. CHRISTIANSON    2,287,757
VEHICLE DIAPHRAGM
Filed Oct. 19, 1940    6 Sheets-Sheet 3
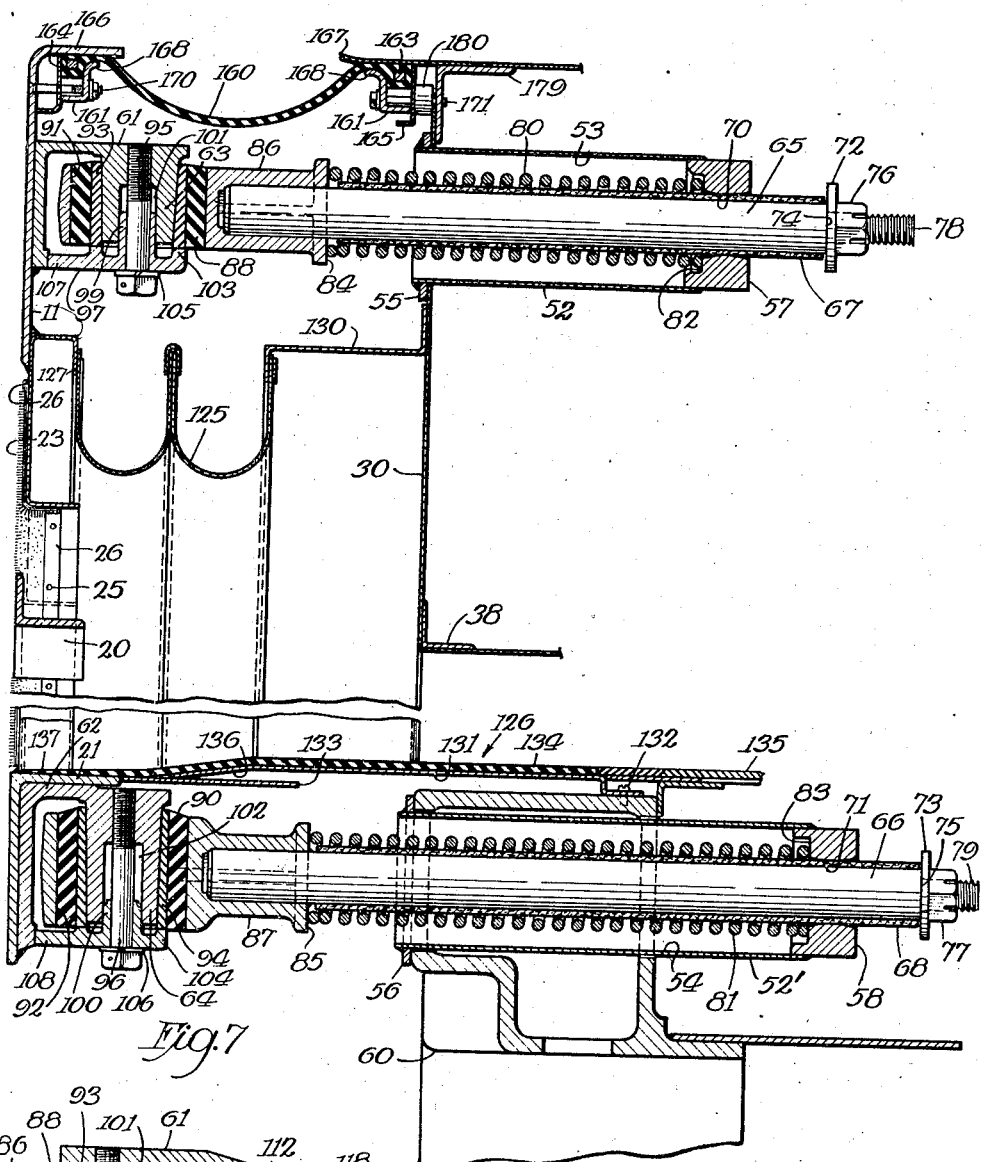
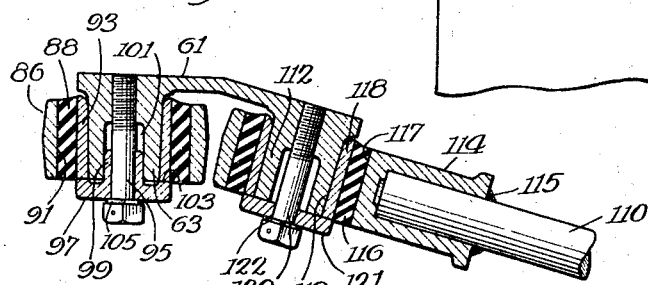
Inventor
Andrew Christianson
By Mason, Brown & Co
Attys.

June 23, 1942.  A. CHRISTIANSON  2,287,757
VEHICLE DIAPHRAGM
Filed Oct. 19, 1940  6 Sheets-Sheet 4
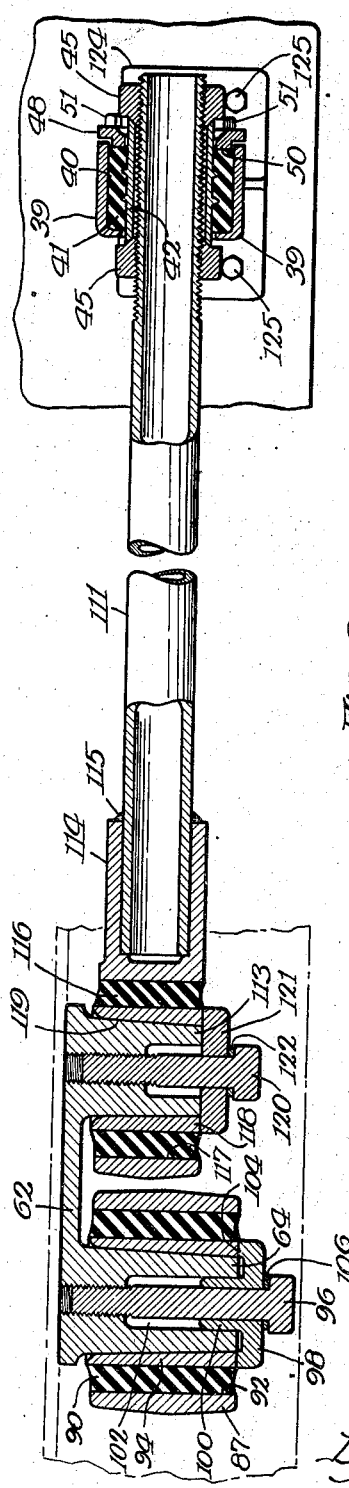
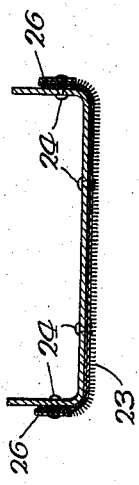
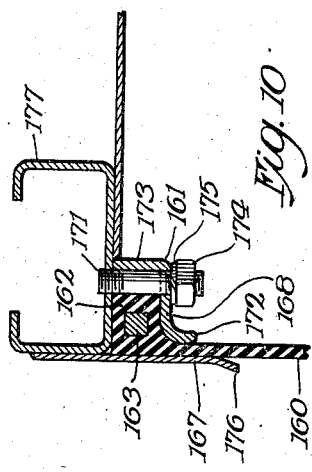
Inventor
Andrew Christianson
By Mann, Brown &Co
Attys.

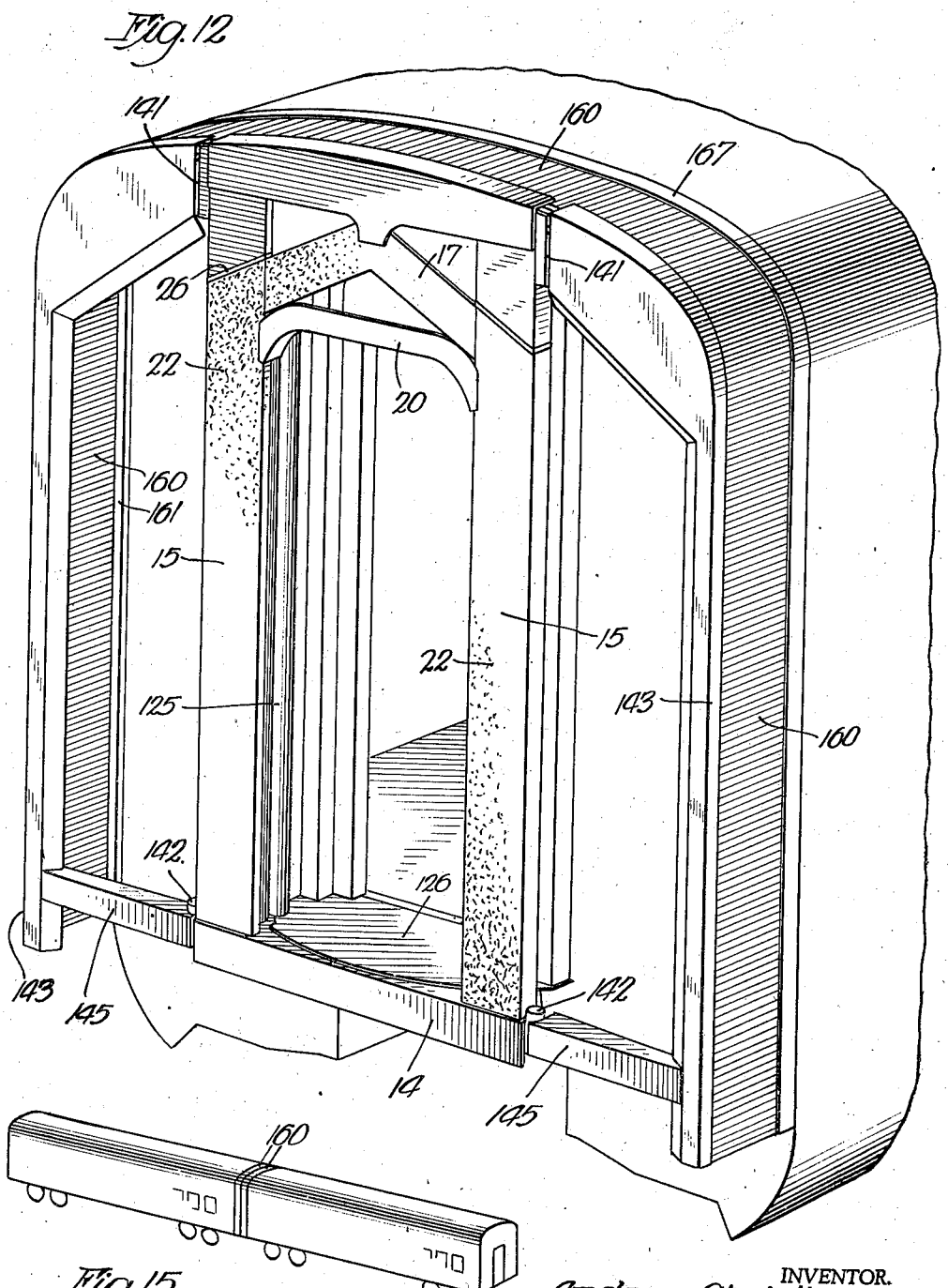

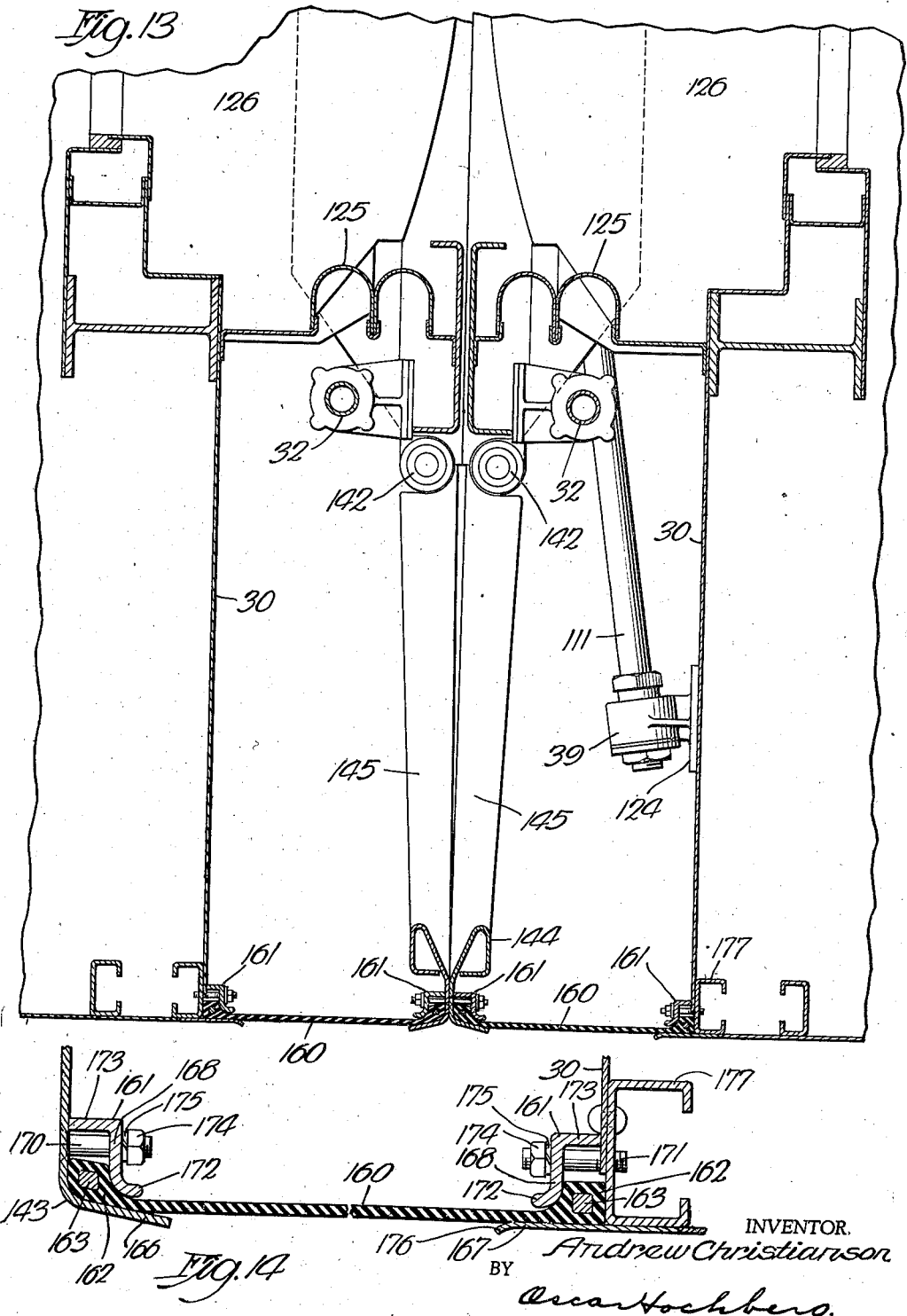

Patented June 23, 1942

2,287,757

UNITED STATES PATENT OFFICE 2,287,757

VEHICLE DIAPHRAGM

Andrew Christianson, Hammond, Ind., assignor to Pullman-Standard Car Manufacturing Company, Chicago, Ill., a corporation of Delaware Application October 19, 1940, Serial No. 361,980

9 Claims. (Cl. 105—15)

This invention relates to railway car diaphragms and has particular reference to constructions using an inner passageway diaphragm in combination with an outer streamlining diaphragm to the peripheral contour of the car.

It is the primary purpose of the invention to provide a vestibule connection between non-articulated cars utilizing inner and outer diaphragms and having a passageway face plate provided with hinged extension wing members affording continuous surfaces coextensive with the respective diaphragms for association with complemental surfaces of an adjacent face plate and permitting negotiation of curves without parting adjoining passageway plates.

It is an important object of the invention so to support and guide the face plate and diaphragms as to maintain alignment thereof with the car and periphery and passageway.

An object of the invention is the provision of single upper and lower central buffing mechanisms for maintaining the face plate and diaphragm in extended position and having means associated with said mechanisms for maintaining parallelism between the face plate and car end.

Another object of the invention is the provision of a face plate fully out of metallic supporting contact with the car from which it is suspended.

Another object of the invention is the provision of transverse strut members positively to prevent lateral displacement of the face plate and guide the in-and-out buffing movements thereof.

A further and important object of the invention is the provision of a face plate having hinged wing members utilizing torsional spring hinges for resisting displacement of and restoration of the wing members to their normal parallel position after displacement.

A still further object of the invention is the provision of a streamlining face plate having buffing surfaces in a single plane adapted to contact complemental surfaces of an adjoining face plate and provided with passageway plate portions out of contact with complemental portions of an adjoining plate and having sealing means on each adapted cooperatively to weatherproof the passageway.

The foregoing and other and more specific objects of the invention will become apparent from the following description read in conjunction with the accompanying drawings in which—

Fig. 2 is a horizontal, sectional view through a car end and face plate showing the relative disposition of the buffing mechanism, the lower, transverse guide strut and the supporting mechanism and passageway;

Fig. 3 is a vertical, sectional view taken on the line 3—3 of Fig. 1 showing the disposition of the upper and lower transverse guiding struts and the relation of the vertical supporting struts;

Fig. 4 is a fragmentary view in section taken on the line 4—4 of Fig. 1 showing an upper supporting strut connection in detail;

Fig. 5 is a top plan view of a fragment of the face plate at the position of the hinge joint between the passageway plate and a wing member;

Fig. 6 is a vertical, sectional view through the hinge showing the torsional spring means;

Fig. 7 is a vertical, longitudinal, sectional view taken on the line 7—7 of Fig. 1 and showing the method of maintaining the diaphragms extended;

Fig. 8 is a transverse, sectional view through the flexible connections of the upper buffing device and transverse guiding strut to the face plate;

Fig. 9 is a transverse, sectional view through the bottom guiding strut showing its flexible connection to the car end wall and to the face plate and also showing the flexible connection between the lower buffing device and face plate;

Fig. 10 is an enlarged, fragmentary, sectional view of the connection of the streamlining diaphragm to a car end wall;

Fig. 11 is a horizontal sectional view through one leg of the passageway plate, showing the method of attaching the fabric covering for weatherproofing the passageway;

Fig. 12 is a fragmentary perspective view of one end of the car, showing the diaphragm and face plate arrangement with the diaphragm indicated somewhat diagrammatically, some of the parts of the car being omitted for the purpose of clarity;

Fig. 13 is an enlarged fragmentary horizontal sectional view of the ends of two coupled cars, showing the relative positions of the cooperating diaphragm and face plate arrangements on the ends of the cars, with the cars in the positions they assume on a straight track;

Fig. 14 is an enlarged detail view of the diaphragm and attaching means on one car, the members being shown in section; and Fig. 15 is a diagrammatic view of a pair of cars coupled together, showing the diaphragm closing the space between the cars.

Figure 1:
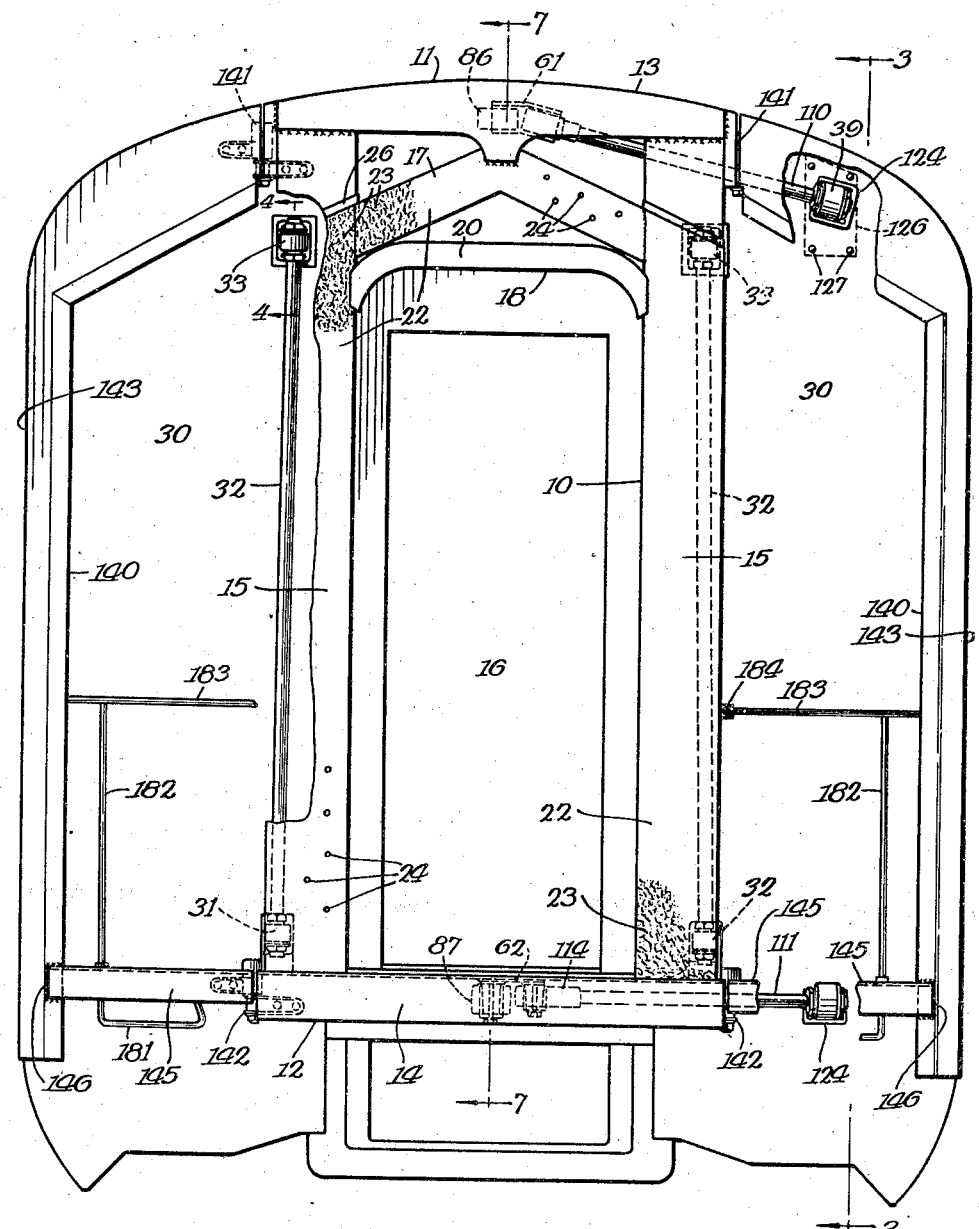
Fig. 1 is an end elevational view of a railway car equipped with a face plate incorporating features of the present invention.

This is related to application Serial No. 157,672, now Patent No. 2,243,854, filed August 6, 1937, by applicant and another.

As best shown in Fig. 1 of the drawings, the main section of the face plate comprises the central portion 10 of the passageway 16, consisting of the upper flanged buffing plate 11 and lower buffer angle 12, connected at the rear side of their respective webs 13 and 14 by pressed channel-shaped vertical leg members 15 at each side of the passageway and all integrated by welding. The vertical leg members 15, in addition to the connections afforded by the buffer members 11 and 12, are connected by a channel-shaped upper passageway plate member 17, secured to the vertical legs and buffer plate 11 by welding and an angle member 18 extending between and welded to the legs 15. The face of the vertical flange 20 of the angle 18 is in the same plane with the buffing surface of the members 11 and 12, thereby affording greater contacting area between adjoining face plates.

As shown in Fig. 7, the vertical legs 15 and top connecting member 17 are in a plane rearwardly of the buffing members 11, 12 and 18, so that between adjoining face plates only those buffing members are in actual complemental metallic contact. The connecting member 17 and the legs 15 from the connecting member to the horizontal flange 21 of the buffer angle are covered with fabric 22, having nap 23 extending outwardly beyond the buffing surface of members 11, 12 and 18 adapted to cooperate with the nap on an adjoining face plate to seal the space existing therebetween and render the passageway between adjoining cars weatherproof at this point. The fabric 22, as best shown in Fig. 11, is secured to the face plate by means of small rivets 24 disposed at intervals throughout the surface area of the fabric, and metal binding strips 26 secure the edges of the fabric to the flanges of the channels 15 and 17 and to the web of channels 15 at the uppermost edges of the fabric. Rivets 25 secure the binding strips 26 in place. The face plate is supported from the car end wall 30 by means of tubular strut members 32 forming the subject-matter of United States Patent No. 2,096,938, of October 26, 1937.

The strut members 32, and their application, are best shown in Figs. 1, 3 and 4, extending vertically between and pivotally secured to brackets 31 and 33, secured, respectively, to the face plate at the bottom and to the car end wall 30 at the top of opposite sides of the passageway 16. The brackets 31 are secured by rivets 34 to plates 35, which are welded along their bottom edges to the horizontal flange 21 of the buffer angle and at their respective back sides to the outside flange of each of the vertical legs 15. The brackets 33 are attached by rivets 36 to pressed channel-shaped plates 37, secured at their flanged edges to the end wall 30 by welding and substantially at the position of end plate 38 for greater strength. The upper and lower brackets are exactly alike and merely reversed in their application to the end wall and face plate, respectively.

Fig. 4 illustrates one of the brackets in detail and the connection of a strut 32 thereto. The bracket is provided with a cup-shaped receptacle 39, into which a flexible unit 40 is placed and through which the strut 32 extends. The unit 40 comprises a collar of flexible material 41, such as rubber, vulcanized to the cylindrical core portion 42 which has encircling ribs 43, affording a better purchase for the rubber and a more positive support for the connection. Preferably the core 42 is countersunk at each end, as at 44, and nuts 45, threaded in opposing relation upon the strut 32 at opposite ends of the core, have protruding portions 46 in complemental engagement with said countersunk ends, whereby the core 42 is maintained in spaced relation to the threaded portion 47 of the strut 32, and an adjustable connection is afforded permitting variation in the length of struts 32. The connections are designed to prevent other than strictly pivotal action, and for this purpose the rubber 41 is initially compressed to prevent vertical oscillation of the joints. After insertion of the units 40 in the cup-like receptacles 39, a metal washer or cap 48, having a projecting annular portion 50 in engagement with the rubber 41, is placed about the protruding portion of the core 42, and, after final adjustment of the nuts 45, is drawn up tightly against the rubber by means of bolts 51 penetrating the cap and threaded into the receptacle 39, thereby to place the rubber under initial compression sufficient to prevent vertical resiliency but allowing enough flexing to permit pivotal action of the joints, thus allowing for the necessary in-and-out and angular movements of the face plate. By the disposition of the struts 32 at opposite sides of the center of the face plate, all vertical movement of the plate is prevented, and canting, or transverse rocking thereof, is eliminated, and vertical alignment between adjoining face plates is positively assured.

The buffing mechanism for keeping the diaphragm and face plate extended is best shown in Fig. 7, and comprises upper and lower central buffing gears of substantially similar construction in the respective planes of the buffing plate 11 and buffer angle 12. Upper and lower built-up spring pockets 52 and 52', comprising cylindrical tubes 53 and 54 having annular flange plates 55 and 56 and perforated end abutment members 57 and 58, secured, respectively, thereto by welding, are secured in the end wall 30 and buffer end sill 60, respectively. Brackets 61 and 62 are welded, respectively, to the buffer plate 11 and buffer angle 12, and each is provided with a depending boss 63 and 64, respectively, having downwardly converging walls affording conical bearings for the respective buffer stem assemblies.

The buffer stem assemblies comprise the stems 65 and 66, covered by sound-deadening composition tubes 67 and 68, extending through openings 70 and 71 in the end members 57 and 58, having washers 72 and 73 for limiting outward movement of the stems, and consequently the face plate, and held in place against shoulders 74 and 75 by nuts 76 and 77 taking the threaded end portions 78 and 79, respectively. Coil springs 80 and 81 about the stems extend from spring seats 82 and 83 in the end members 57 and 58 to abutments 84 and 85, afforded by the heads 86 and 87, fixedly secured to the stems, and exert a force therebetween to keep the face plate and diaphragm extended and to absorb the movement of the face plates between associated cars in a train.

The buffer stem heads 86 and 87 are designed to cooperate with the bosses 63 and 64 on the brackets 61 and 62 in such manner as to render the action of the mechanism noiseless and to return the face plate to its normal position parallel to the car end 30 after displacement. Torsional spring devices, formed as integral units with the respective heads, serve this dual purpose and comprise hollow cylindrical units of rubber 88 and 90, vulcanized within openings 91 and 92 in the respective heads, and to the outer cylindrical walls of inner bearing members 93 and 94. On their inner peripheries the bearings 93 and 94 are conical to the same degree as bosses 63 and 64, about which they are adapted to engage in close frictional contact induced by bolts 95 and 96 threaded into the bosses and drawing the bearings up tight to prevent any rotative action therebetween. The heads of the bolts seat against bottom plates 97 and 98, having guiding bosses 99 and 100 entering recesses 101 and 102 in the bosses 63 and 64 to insure engagement of annular bearing surfaces 103 and 104 with the bottoms of bearing members 93 and 94, thereby to press such members into positive engagement with the bearings 63 and 64. Lock washers 105 and 106, interposed between the heads of the bolts and the plates 97 and 98, insure permanent retention of the bolts. The plates 97 and 98 each have extensions 107 and 108 bearing against suitable surfaces on the vertical flanges of brackets 61 and 62, thereby affording, in each connection, a two-point resistance to buffing stresses and serving to eliminate the otherwise excessive bending moment in the respective single horizontal top flanges.

Angular displacement of the face plate is resisted by the torsional force thereby generated in the rubber 88 and 90, which also effects restoration of the face plate to its normal position parallel to the end wall 30. The inherent torsibility of the respective upper and lower buffer stem connections to the face plate is adequate to maintain proper relation of the face plate with respect to the car end at all times, the resistance of the rubber in torsional shear being directly proportional to angular displacement of the face plate.

Referring now to Figs. 1, 2, 3, 8 and 9, it will be seen that means are provided positively to prevent lateral movement of the face plate and to insure alignment thereof with the passageway and car periphery at all times. Upper and lower transverse tubular strut members 110 and 111, pivotally connected to the face plate and car end wall, in combination with vertical struts 32, positively eliminate any tendency for the face plate to move in any direction other than necessary. Upper and lower brackets 61 and 62 on the face plate, in addition to the bearings 63 and 64, are also provided with depending bosses 112 and 113, respectively, to which the transverse struts are adapted to be connected in a manner substantially the same as the connection of the buffer stems 65 and 66 to the bearings 63 and 64, and since the connections of the upper device 110 and those of the lower member 111 are identical the following description is equally applicable to either.

The struts 110 and 111 have heads 114 fixedly secured thereto by welding, as at 115, and each of which is provided with a rubber annulus 116, vulcanized within round openings 117 in the heads and to the outer cylindrical surfaces of bearings 118 which, like the buffer stem connections, are conical on their inner surfaces 119 to cooperate with similar complementary surfaces on the bearings 112 and 113, into engagement with which they are tightly drawn by bolts 120 to prevent any relative rotation therebetween by sheer frictional resistance. The bolts 120 are threaded into bearings 113 and 114, and exert an upwardly directed force on the bottom edges of bearings 118 by means of bottom plates 121 against which the heads of the bolts seat and are held from reverse rotation by lock washers 122.

The struts 110 and 111 extend from the face plate connections just described to brackets 124 secured to the car end wall 30, both top and bottom, by bolts 125. The end wall is reinforced at the position of the upper bracket by a plate 126, secured thereto by rivets 127; and the lower bracket is applied directly to the end sill 128. The brackets 124 are exactly like the brackets 31 and 33, except for the fact that they are designed to cooperate with the struts 110 and 111 to function in a horizontal direction, and include cup-like receptacles 39 into which flexible units 40 are placed and through which the struts extend. The units are secured in place by cap rings 48, having annular projections 50 engaging the rubber 41 initially to compress it when bolts 51 are threaded home in the receptacles 39. The length of struts 110 and 111 is variable by adjustment of nuts 45 at opposite ends of the respective unit cores 42. Connections of this type to the car end permit sufficient pivotal action to allow for necessary in-and-out movement of the face plate while positively eliminating any movement thereof in a transverse direction, and the connections to the face plate allow for angling of the face plate with respect to the car end in addition to the pivotal stress imposed by the in-and-out motion, and the resultant greater torsional strain, combined with lateral forces encountered, is better borne by connections of the type used at this point.

It is to be noted, looking at Figs. 1 and 3, that the strut 111 is horizontal and slopes only in an inward direction toward the car end, but the strut 110 slopes inwardly from the face plate and in a downward direction toward the car end for connection with the upper bracket 124, which has the receptacle 39 arranged at an angle necessary to receive the strut, but if desired both struts may be arranged in like manner—preferably parallel and horizontal.

The passageway 16 from the end wall 30 to the face plate is completed by a diaphragm 125 and a foot plate 126 of novel construction. The diaphragm 125 is of the usual collapsible bellows-fold type and is secured to the face plate at the top by means of depending flange 127 and to the side legs through the medium of Z-shaped members 129, and is secured at its inner end to the inwardly extending flanges of the top and sides of an extension structure 130 secured to the car end wall, and, in adjoining cars, cooperates with the diaphragms to provide a continuous enclosed passage from car to car since the seal afforded by fabric 23 prevents the entrance of weather between the face plates. At the bottom foot-plate structures 126 form a substantially continuous walkway between cars. The foot-plates each comprise a metal plate 131, secured at 132 to the end sill casting 60 extending the width of the passageway and resting at its free end upon a flat plate 133, integrally secured to the horizontal flange 21 of the buffer angle by welding and forming a continuation flush with the surface thereof, upon which the plate 131 slides as the face plates are affected by movement of cars in a train. The plate 131 beyond the connection 132 is raised slightly from the end sill casting 60 to place the covering 134 on a level with the vestibule floor 135, and at its free end slopes downwardly at 136 to rest upon plate 133 and avoid a too abrupt change in height of the surface of the foot-plate.

The covering 134 is of rubber vulcanized directly to the plate 131, and provides a secure footing for passengers passing through the vestibule. The rubber 134 extends beyond the free edge of the foot-plate and rests upon the plate 133 and the flange 21 of the buffer angle, and slides thereon as the face plate shifts. The rubber slopes at 136 with the plate 131 and from the base of the slope tapers, as at 137, to a substantially imperceptible edge closely adjacent the edge of the buffer angle, and affords a non-slip surface practically the full distance between adjoining cars. The portion of the rubber resting upon the buffer angle flange 21 and plate 133 is arcuate at its free edge, as shown in Fig. 2, to permit angling of the face plate without disturbing the rubber, and the closest space between adjacent edges of the rubber on adjoining cars is sufficient to prevent displacement of the rubber during normal buffing action between cars and affords a foot-plate extending practically to the buffing surface of the buffer angle which, should the buffing forces momentarily become too great, will be flexed sufficiently to accommodate the inward movement and again return to its normal flat position after release.

As shown in Figs. 1 and 2, the face plate 10 is equipped with lateral extensions providing a combination passageway and streamlining face plate to the peripheral contour of the car. The extensions comprise wing members 140, hinged top and bottom at 141 and 142, respectively, to opposite sides of the plate 10. The hinged wing members each consist of a pressed plate flanged along the peripheral edge 143, and at the inner side rebent upon itself to provide a strengthening box section 144 and extending from the upper hinges 141 outwardly and downwardly, and connected with the lower hinges 142 by means of horizontal members 145 welded to the vertical legs of the wing members at 146. The wing members 140 are directly connected with the plate 10, and are controlled with respect to vertical and lateral movement by the struts 32 and 110 and 111, respectively, and the entire plate is thus maintained in alignment with the passageway and car periphery without metallic contact with either. The upper and lower hinges 141 and 142 are alike, and, as shown in detail in Figs. 5 and 6, are novel in construction and operation. The hinge butts 147 are attached to the passageway plate 10 by rivets 148, countersunk in the outer face of the plate, and the leaf portions 150 are attached in the same manner to the wing members 140 by rivets 151.

The leaf members 150 are each provided with a vertically disposed barrel 152 of greater height than the width of the attaching portion within which a larger amount of live rubber 153 is disposed than would otherwise be possible, and vulcanized thereto. A central metallic core 154 is embedded in the rubber and secured by vulcanization, and is provided with a tapering depending integral extension 155, which enters the correspondingly shaped complemental opening 156 extending vertically through the hinge butt 147, and is held in tight frictional engagement therewith to prevent relative rotation by means of a nut 157, threaded on the end of the extension, and a lock washer 158. Thus it will be seen that the core 154 is fixedly secured to the passageway plate 10, and any pivotal displacement of the wing members 140 with respect thereto will be resisted by the rubber acting in torsion to restore the wing members to their normal positions. The upper and lower hinges at opposite sides of the passageway plate are in vertical alignment and operate simultaneously to resist pivotal action of the wing members, and by reason of the extended height of the barrels 152 a greater mass of rubber is contained in each hinge, providing torsional springs of greatly increased resistance adapted resiliently to maintain the wing members in their normal position. The wing members 140, when in their normal position parallel to the main portion of the face plate 10, are in a plane rearwardly thereof, as shown in Fig. 2, whereby complemental wing members of coupled cars on a straight track are out of contact with each other and are held in this position by the forces exerted by the spring-actuated hinges 141 and 142 against the resistance offered by a streamlining diaphragm 160 which connects the face plate and wing members with the car periphery in a manner providing a substantially unbroken surface contour between cars, and conceals the face plate supporting and control mechanism from view and limits the outward movement of the wing members 140.

The diaphragm 160 extends between and is held in place by connections 161 of similar construction secured to the face plate and car end and serving to hold the diaphragm merely by clamping pressure. The diaphragm is of rubber and is provided with enlargements 162, which are engaged by the connections 161. Flexible cores 163 are embedded in the enlargements and serve to prevent escape thereof from the connections 161 by preventing compression of the rubber, which would allow it to squeeze through the opening left by the clamp as the rubber is placed under tension. In the application of the diaphragm 160 to the face plate and car end, abutment or filler members 164 and 165, attached to the face plate and car end respectively, are provided at the top and are so formed as to cause the diaphragm top to take a sinuous configuration across the width of the car to relieve the tension in the rubber at points of concentrated stress, since the complete diaphragm is designed so as not to be placed under any substantial tension but merely sufficient to maintain the vertical side portions taut to present a smooth surface.

The filler members 164 and 165 have their greatest width at the position of the hinges 141 where the greatest movement of the face plate away from the car end occurs, as indicated in broken lines in Fig. 2, and thence taper in opposite directions toward the center and to the level of the inside face of the vertical legs 140 at the sides, whereby adjacent filler members on the face plate and car end are closest at this point, affording the greatest amount of slack in the diaphragm 160 to avoid stretching the rubber at either hinge point as the face plate angles in passing a curve. At the center between hinge points the diaphragm top is of greater width to provide more slack than at other points to take care of the outward movement of the face plate to the uncoupled position, since the vertical portions of the diaphragm at the sides are not stretched at any time due to the pivotal action of the hinges 141 and 142, the spring action of which is sufficient only to keep the sides taut, and the top between the hinge points and respective car sides will not be overstretched due to the convergence of the filler members 164 and 165. When coupled cars pass around a curve in the track the hinged wing members on the outer side of the cars will pivot about their hinge points as the face plates angle, keeping the diaphragm sides taut but allowing a gap to appear between adjoining faces of the wing members, since the diaphragms are not stretched, and at the inner side of the cars the wing members contact with each other to collapse the diaphragms which, after release, are returned to their normal tautness by the action of the torsional spring hinges, but the main passageway portions 10 of the face plates remain in contact at all times.

Although the filler members 164 and 165 give the diaphragm top a sinuous contour in plan, this is hidden at the face plate by the overlying flange 166 and at the car end by an overhanging flange plate 167 the edge of which, when the face plate is in its normal coupled position, is parallel to the edge of the flange 166, giving a more pleasing appearance and better streamlining. The connections 161 comprise segmental clamping members 168 substantially co-extensive with the diaphragm 160, engaging the enlargements 162 to secure the diaphragm to the face plate and car end by bolts 170 and 171, respectively. The clamps 168 are angle-shaped, having a curved flange 172 engaging the rubber to prevent abrasion as the diaphragm is flexed, and a flange 173 abutting the face plate or car end, as the case may be, and confine the diaphragm edges against the overlying flanges 166 and 167 under the action of nuts 174 and lock washers 175, taking the bolts 170 and 171 on the face plate and car end, respectively. The flange 167 is curved at the exposed edge 176 also to prevent abrasion of the rubber as the diaphragm is flexed, and both of the overlying flanges 166 and 167 act to exclude the weather from the respective connections 161. The bolts 170, secured in the face plate, are provided with countersunk heads, and the bolts 171 are studs threaded into the car end and corner post 177. At the top where the studs 170 penetrate the filler members 165 and enter the end carline 179, collar members 180 are placed about the bolts to brace the fillers from the car end. It will be seen that the elasticity of the rubber in the diaphragm is not relied upon to compensate for the movement of cars in negotiating curves in the track, and it is not stressed or stretched beyond its elastic limit at any time.

Safety irons 181 and 182, for the convenience of trainmen in switching, are secured to the wing members 140, and the cross rod 183 is hinged to the passageway plate 10 at 184 in line with the hinges 141 and 142.

The outer diaphragm is initially stretched a sufficient amount to make it taut so that it is free from wrinkles when the coupled cars are normally on a straight track. The clamping means employed for holding the diaphragm in place embrace the marginal portions only of the diaphragm, and the bolts and clamping devices do not penetrate the diaphragm itself. Thus it is seen that the diaphragm, when in place on the end of a car, is imperforate.

When the coupled cars assume an angular relation with respect to each other, as when they pass over a curve, the cooperating wing members on the outside of the curve are pulled away from each other at their outermost edges, and in this instance the continuous smooth outer surface contour of the cars temporarily is broken. The abutting face plates are held tightly together, so that the seal of the passageway walls at all times is maintained when the cars are coupled together.

The wing members on the inside of the curve are forced toward their respective car end walls, and the outer diaphragms on the inside of the curve, in this instance, are caused temporarily to wrinkle. When the cars again assume their positions on a straight track the diaphragms on both sides of the cars return to their normal taut positions and effectively carry out the smooth streamline appearance of the train in the spaces between the cars, as is diagrammatically best shown in Fig. 15.

The function of the outer diaphragm is to close the space between the cars. It is preferably made of rubber or other suitable inherently elastic material, and has enlarged peripheral edges, as best shown in Fig. 14. A core 163 in each of the peripheral enlargements is preferably flexible so that the diaphragm can more readily be fitted to the contour of the car. The inside edge of each peripheral marginal enlargement slopes inwardly and merges into the plane of the diaphragm 160 to form a shoulder. The clamping member 168 of each connection 161 terminates in a curved flange 172, which conforms to the contour of the sloping shoulder on the enlarged edge of the diaphragm. This shoulder on the diaphragm cooperates with the curved flange 172, and is thereby held in place against the car end wall between the flange 166 or 167, as the case may be, and the corresponding clamping means 161.

From the foregoing it will be seen that there has been provided an improved face plate and diaphragm construction wherein there is no supporting metallic connection between the face plate and car end, and in which all movements of the face plate are positively controlled and the diaphragm is free from stress, and normal parallelism of the face plate with the car end is assured by improved centering mechanism, and in which the passageway plates of adjoining face plates are out of metallic contact and provided with weather-excluding means.

Ideally, the corresponding wing members 145 (Fig. 13) at the adjacent ends of the coupled cars are in engagement with each other along their outer peripheral edges when the cars are on a straight track, so as to completely close off the space between the cars to afford a continuous smooth outer contour and preserve the streamline appearance of the cars. Under these conditions, the diaphragm 160 is under sufficient tension to make it taut and free from wrinkles. Obviously, this is an ideal condition and in actual practice it may be necessary to provide a slight space between the corresponding wing members 145 in order to make allowances for any increases in lengths of the diaphragms 160 which will result from the permanent stretch taking place in the material.

I claim:

1. In a vehicle having an end wall, an inherently elastic diaphragm extending at right angles outwardly from the vehicle end wall, diaphragm supporting means for the free edge of the diaphragm connected to said vehicle and adapted to have longitudinal movement with relation thereto and being maintained spaced from the end wall at a variable distance dependent upon said longitudinal movement of said supporting means with respect to said vehicle, the diaphragm being supported along one of its edges in fixed relation to the vehicle end wall and held under initial tension between said vehicle and the cooperating diaphragm supporting means, and secured at its opposite edges by independent and separate clamping means embracing the marginal portions only of the diaphragm and leaving the diaphragm imperforate.

2. For use between a pair of vehicles attached together in tandem in such a manner that they are free to assume different angular relations during their movement around a curve, diaphragm supporting means forming a part of one of said vehicles and maintained in variable longitudinal spaced relation to the end wall of said vehicle, such spacing being dependent on the angular relation of the vehicles, an inherently elastic diaphragm in the space between the adjacent end walls of the vehicles and supported along one of its edges on one of the vehicles and held under initial tension between said vehicle and the cooperating supporting means, and secured at its oppositie edges by independent and separate clamping means embracing the marginal portions only of the diaphragm and leaving the diaphragm imperforate and free to stretch and contract during angular movement of the vehicles.

3. In a vehicle having side walls and an end wall, an inherently elastic diaphragm extending at right angles outwardly from the vehicle end wall and having portions disposed in the outer planes of said side walls, diaphragm supporting means for the free edge of the diaphragm connected to said vehicle and maintained in longitudinal spaced relation to the end wall, the diaphragm being supported along one of its edges on the vehicle end wall and held under initial tension between said vehicle and the cooperating diaphragm supporting means, and secured at its opposite edges by independent and separate clamping means embracing the marginal portions only of the diaphragm and leaving the diaphragm imperforate.

4. In a vehicle having side walls and an end wall, an inherently elastic diaphragm extending at right angles outwardly from the vehicle end wall and having portions disposed in the outer planes of said side walls, diaphragm supporting means for the free edge of the diaphragm connected to said vehicle and adapted to have longitudinal movement with relation thereto and being maintained spaced from the end wall at a variable distance dependent on said longitudinal movement of said supporting means with respect to said vehicle end wall, the diaphragm being supported along one of its edges in fixed relation to the vehicle end wall and along its opposite edge by the cooperating diaphragm supporting means and held under initial tension between the vehicle end wall and the supporting means, and being secured at said opposite edges by independent and separate clamping means embracing the marginal portions only of the diaphragm and leaving the diaphragm imperforate.

5. In a vehicle having side walls and an end wall, an inherently elastic diaphragm extending at right angles outwardly from the vehicle end wall and having portions disposed in the outer planes of said side walls, diaphragm supporting means for the free edge of the diaphragm connected to said vehicle and maintained in longitudinal spaced relation to the end wall, the diaphragm being supported along one of its edges on the vehicle and held under initial tension between said vehicle and the diaphragm supporting means, separate diaphragm supporting members on the said vehicle and on the spaced supporting means embracing the marginal portions only of the diaphragm and leaving the diaphragm imperforate and including an abutment engaged by the said enlarged margin.

6. A diaphragm construction for vehicles comprising an inherently elastic diaphragm disposed in initial tension between adjoining vehicles, means for securing the diaphragm to the respective vehicles without perforation of the diaphragm comprising integral enlargements at the opposite edges of the diaphragm, abutment means on the vehicles and engaged with said enlargements, and an independent clamping member embracing each enlargement and having a free edge spaced from the adjacent abutment by a distance less than the thickness of the enlargement and curved away from the diaphragm to prevent abrasion thereof.

7. For use in a train unit including a plurality of vehicles which are free to assume different angular relations during movement of the unit around a curve, an inherently elastic diaphragm secured along one of its edges to one of the vehicles and secured at its other end under initial tension to supporting means spaced from the last named vehicle so as at least to partially close the space between adjoining vehicles, and means for securing the opposite ends of the diaphragm comprising independent and separate clamping means embracing the marginal portions only of the diaphragm and leaving the diaphragm imperforate and free to stretch and contract during angular movement of the vehicle.

8. In a vehicle, an inherently elastic diaphragm extending at right angles outwardly from the end of the vehicle, diaphragm supporting means for the free edge of the diaphragm connected to said vehicle and adapted to have longitudinal movement with relation thereto and being maintained spaced from the end wall at a variable distance dependent upon said longitudinal movement of said supporting means with respect to said vehicle, the free edge of the diaphragm being secured to said supporting means for maintaining the diaphragm under initial tension, fastening means in the vehicle adjacent to the said vehicle end and having an abutting face on the side of the fastening means away from the said supporting means, the diaphragm having means along its edge abutting against the said abutting face, and said fastening means including a member for holding said diaphragm means against the abutting face and leaving the diaphragm imperforate.

9. A diaphragm construction for vehicles free to assume different angular relations with respect to each other comprising an inherently elastic diaphragm disposed under initial tension between adjoining vehicles, means for securing the diaphragm to the respective vehicles without perforation of the diaphragm including integral enlargements at the opposite ends of the diaphragm, abutment means on the vehicle and engaged with said enlargements, and independent and separate clamping means embracing said end portions only of the diaphragm and leaving the diaphragm imperforate and free to stretch and contract during angular movement of the vehicle.

ANDREW CHRISTIANSON.